United States Patent [19]
Moe et al.

[11] Patent Number: 5,875,995
[45] Date of Patent: Mar. 2, 1999

[54] PIVOTING DOOR TYPE THRUST REVERSER WITH DEPLOYABLE MEMBERS FOR EFFLUX CONTROL AND FLOW SEPARATION

[75] Inventors: Jeffrey W. Moe, Chula Vista; Roy E. Cariola, San Diego; Dennis E. Lymons, El Cajon, all of Calif.

[73] Assignee: Rohr, Inc., Chula Vista, Calif.

[21] Appl. No.: 859,218

[22] Filed: May 20, 1997

[51] Int. Cl.$^6$ ................................................. B64C 33/04
[52] U.S. Cl. ................................. 244/110 B; 239/265.29; 60/230
[58] Field of Search .................. 244/110 B; 239/265.29; 60/230

[56] References Cited

U.S. PATENT DOCUMENTS

| | | | |
|---|---|---|---|
| 3,106,372 | 10/1963 | Kutney | 244/110 B |
| 3,567,128 | 3/1971 | Urquhart | 244/110 B |
| 3,570,767 | 3/1971 | Lawson | 244/110 B |
| 4,894,985 | 1/1990 | Dubois et al. | 244/110 B |
| 5,003,770 | 4/1991 | Schegerin et al. | 244/110 B |
| 5,284,015 | 2/1994 | Carimali et al. | 244/110 B |
| 5,671,598 | 9/1997 | Standish | 244/110 B |
| 5,716,025 | 2/1998 | Meyer | 244/110 B |

FOREIGN PATENT DOCUMENTS

| | | | |
|---|---|---|---|
| 1002709 | 8/1965 | United Kingdom | 244/110 B |

*Primary Examiner*—Galen L. Barefoot
*Attorney, Agent, or Firm*—Patrick J. Schlesinger

[57] ABSTRACT

A novel pivoting door thrust reverser which provides a nozzle for the exhaust of a bypass engine that ensures a smooth continuous flow path for the exhaust without leakage around the pivoted upper and lower reverser doors. The upper reverser door is provided with a pair of biased cooperating crescent shaped kicker members that are biased outwardly in a controlled movement when the doors are deployed to deflect the upper portion of the reversed exhaust efflux forwardly in a predetermined direction to avoid interference with the control surfaces of the aircraft. The lower reverser door is provided with pivoted splitter plates that are biased outwardly when the door is deployed to abut and form a unitary splitter element that divides the lower exhaust efflux into two portions that are directed forwardly and away from the inlet of the engine to preclude foreign object damage to the engine. The thrust reverser is lightweight, uses simple, inexpensive mechanisms, and operates in a very efficient manner when deployed as a thrust reverser and when stowed as an exhaust nozzle for the engine.

17 Claims, 7 Drawing Sheets

PIVOTING DOOR TYPE THRUST REVERSER WITH DEPLOYABLE MEMBERS FOR EFFLUX CONTROL AND FLOW SEPARATION

BACKGROUND OF THE INVENTION

1. Field of the Invention

This invention relates generally to the field of pivoting door thrust reversers and more particularly, but not by way of limitation, to an improved thrust reverser which provides improved mechanisms for directing the exhaust efflux to preclude foreign object damage to the engine and interference with the control surfaces of the aircraft and that provides an exhaust nozzle having improved performance in flight.

2. Description of the Prior Art

In order to reduce the landing distance of a jet engine powered aircraft, as well as to increase the margin of safety when the aircraft is landing on a wet or icy runway, thrust reversers are utilized on the jet engines in order to provide a braking thrust for the aircraft. Such thrust reversers function to reverse the direction of the jet thrust, from a normally rearward direction used for propelling the aircraft in flight, to a generally forward direction for slowing or braking the aircraft.

For low bypass jet engines, the thrust reversers are typical formed by pivoting thrust reverser doors which are pivotally mounded on a fixed structure attached to the engine and to another component of the nacelle. These reverser doors and fixed structure cooperate to form the final nozzle of the gas turbine engine propulsion system. The doors are capable of pivoting between two positions about two spaced parallel axes which are transverse and substantially diametrical with respect to the exhaust of the engine.

The first position finds the doors in a stowed position, out of the direct path of the exhaust forward thrust of the engine. In this position, the doors form, in cooperation with the fixed structure, the exhaust nozzle of the gas turbine engine so that the thrust of the engine is directly rearward, thereby producing forward thrust for the aircraft. In a second position, the doors are pivoted about their pivot axes until their trailing edges abut in a transverse thrust deflecting or deployed position, to block and redirect the engine thrust generally forward and thereby produce the braking thrust for-the engine when needed.

The thrust reversers are generally mounted on a fixed structure. This fixed structure basically serves a dual role. In the forward thrust mode of operation of the jet engine, i.e. when the reverser doors are in the stowed position, the fixed structure forms a part of the envelope of the jet flow and is intended to ensure the best possible flow continuity with the inner skin of the thrust reverser doors.

In the reverse thrust operation, i.e. when the reverser doors are deployed, the fixed structure provides the throat of the nozzle, and defines as well the spacing distance from the thrust reverser doors.

Both of these functions of the fixed structure are important criteria for the proper operation of the jet engine. While in the forward thrust mode, a good flow continuity is essential to the proper forward thrust performance. In addition, the jet exhaust pipe must adequately define the throat area in reverse thrust and the spacing distance in order to satisfy the operational compatibility requirements of the engine and of the thrust reverser when the thrust reverser doors are deployed.

Experience has shown that often thrust reversers tend to favor performance more in the reversing function of operation. But this, unfortunately, is at the expense of the performance provided in the forward thrust mode of operation, meaning that performance degradation during forward thrust is generally associated with the installation of thrust reversers. This is unfortunate since thrust reversers are in operation generally for only 15 to 30 seconds of a flight.

Further, thrust reversers of the prior art have not dealt well with the requirements of deflecting one portion of the reversed exhaust flow upwardly so that it will not adversely effect control surfaces of the aircraft and deflecting a second or other portions of the reversed exhaust flow downwardly and forwardly in a manner that will not cause foreign objects lying on the surface of the landing field to be blown forward so that such objects may be ingested by the engine and thereby cause injury to such engine. Attempts to provide simple inexpensive mechanisms to control the exhaust efflux in the desired manner have not been entirely successful.

Typical pivoting reverser doors generally require a pit or concave portion near their leading edges. This type of configuration does not provide a smooth internal exhaust flow through the nozzle contributing to the degradation in performance during operation in the forward thrust mode. Such doors often have an efflux deflecting member positioned near the leading edge, with such member being pivoted downwardly to deflect the exhaust flow as the door is deployed. Also, problems have been encountered with past thrust reverser door designs in attempting to seal the doors adequately in the stowed position and preclude the exhaust pressure in flight leaking out past the stowed doors to cause drag and marginal performance as well as raising the possibility of having the doors deploy in flight.

Thus, a need exists for a pivoting door thrust reverser that provides a simple, inexpensive, and highly reliable mechanism for the desired forward deflection of the exhaust flow in the deployed mode and to direct portions of the reversed flow so as to avoid interference with control surfaces of the aircraft and to preclude the downwardly directed reversed flow from blowing foreign objects forwardly to a position for ingestion by the engine. A need also exists for a thrust reverser that meets the above criteria while precluding leakage from the reverser unit while in flight and also provides a nozzle that provides a relatively smooth continuous flow for the exhaust of the engine. It is believed that such requirements are met by the instant invention which provides a practical state of the art thrust reverser in an economical manner.

SUMMARY OF THE INVENTION

Briefly stated, the present invention provides a pivoting door thrust reverser for use with a bypass aircraft engine that includes a fixed structure arranged to be secured to the aft end of the engine and adapted to provide a nozzle for the exhaust of the engine. First and second generally symmetrical thrust reverser doors are pivotally attached at the aft end of the fixed structure and are adapted to be movable between a stowed non-reversing position and a deployed thrust reversing position. Each of the reverser doors is provided with a pair of biased members that are biased outwardly to a desired position as the doors are pivoted to a deployed position thus deflecting the reversed flow of the engine in a predetermined manner so as to preclude foreign object damage to the engine from ingestion of objects from a landing field surface being blown forward and to preclude interference of the reversed air flow with the control surfaces of the aircraft. The kicker members of the first reverser door preferably are generally crescent shaped and are biased outwardly by torsion spring means to a desired position when the door is deployed. Such kicker members and longitudinally extending fences provided along the lower edges of the door direct the portion of the reversed exhaust flow forwardly in a desired manner to preclude interference with the aircraft control surfaces.

The second or lower reverser door is provided with two spring biased pivoted generally rectangularly shaped flow separator members that are biased outwardly when the door is deployed to rotate inwardly into abutment with each other to provide a unitary flow splitter that divides that portion of the exhaust flow that is reversed by the second door into two portions which are directed forwardly to each side and away from the inlet of the engine to each side to preclude foreign objects being ingested by the engine. Suitable longitudinally extending fences are provided on the longitudinal edges of the second door and cooperate with the door and kicker members in deflecting the exhaust in the desired direction.

Bumper members are secured to the fixed structure and cooperate with the rotatable members of each door to urge such members to a secured home position when the doors are pivoted and returned to a stowed position.

The fixed structure and the reverser doors cooperate to provide an exhaust nozzle that has a smooth interior surface that is generally continuous to minimize drag of the thrust reverser when in flight. An inner and outer set of resilient seals are provided on the fixed structure for cooperation with portions of the reverser doors to preclude leakage of the exhaust in flight and to further enhance performance of the reverser.

Other features and attendant advantages of the present invention will become apparent to those skilled in the art from a reading of the following detailed description in conjunction with the accompanying drawings which illustrate the invention.

BRIEF DESCRIPTION OF THE DRAWINGS

This invention will be described in greater detail by way of reference to the accompanying drawings, which show by way of non-limiting examples, certain preferred features and embodiments of the invention, and in which.

DETAILED DESCRIPTION OF THE PREFERRED EMBODIMENT

Figure 1:
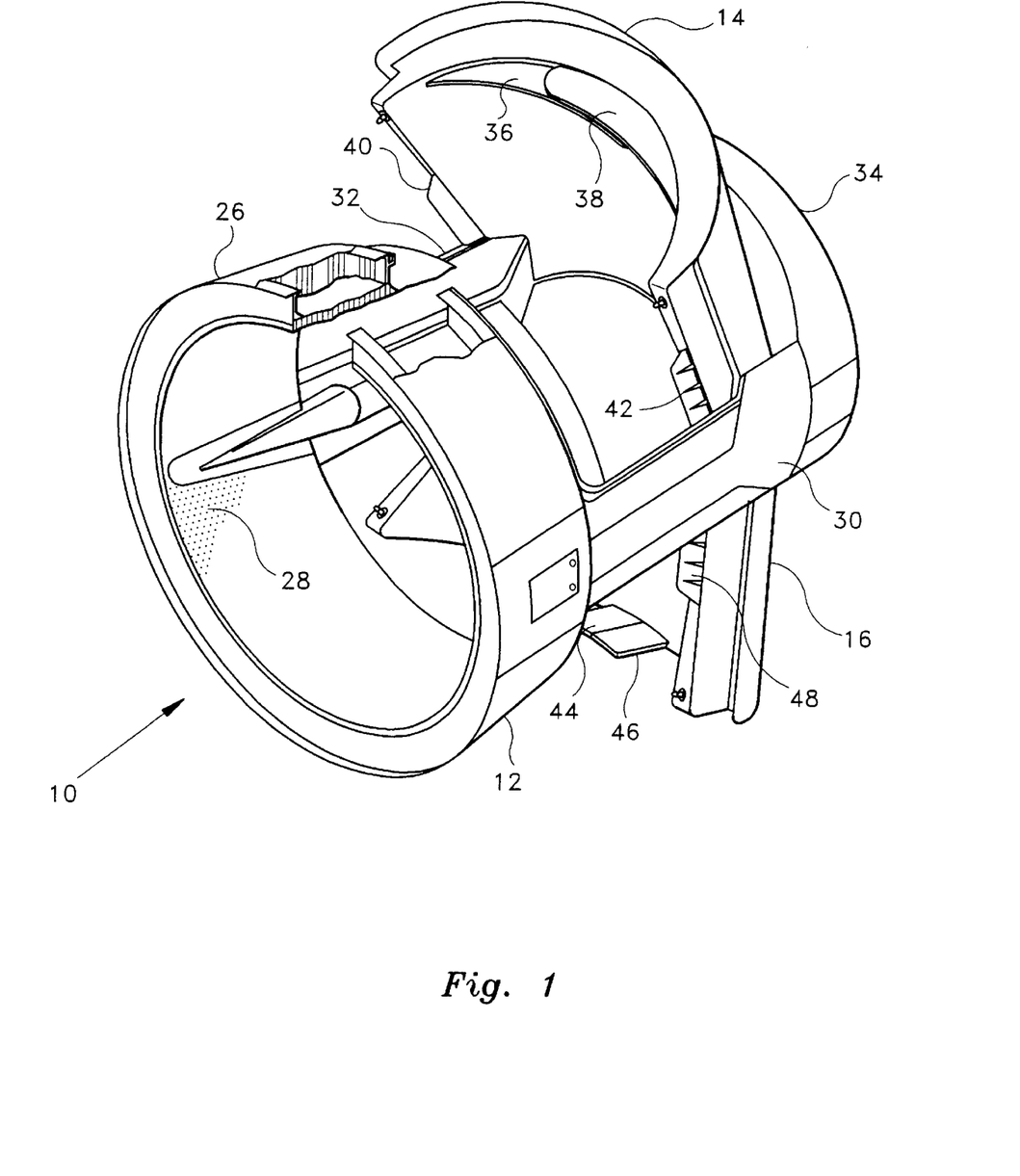
FIG. 1 is a simplified perspective, having a partial cutaway portion, of a thrust reverser constructed in accordance with a preferred embodiment of the present invention.

Referring now to the drawings in detail and in particular to FIG. 1, the reference character 10 generally designates a pivoting door thrust reverser constructed in accordance with a preferred embodiment of the invention. The pivoting door thrust reverser 10 includes a fixed structure 12 and a pivoted first or upper reverser door member 14 and a pivoted second or lower reverser door member 16. The doors 14 and 16 are arcuate and are generally symmetrical in shape. The fixed structure 12, as-seen in FIG. 3, is adapted to be secured to the aft end of a bypass engine 18 which issues a hot gas stream therefrom and to a suitable nacelle component 20 which cooperates with the engine 18 to provide a bypass duct 22 for the flow of bypass air generated by the engine.

Figure 3:
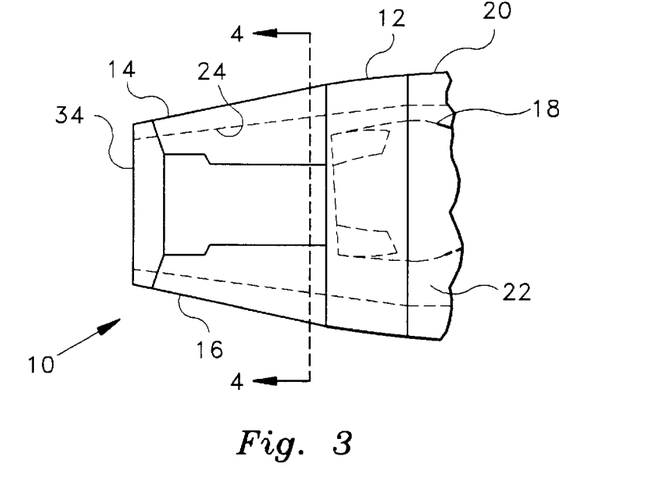
FIG. 3 is a schematic view illustrating the thrust reverser secured to the engine and to the nacelle housing of the engine.

As shown most clearly in FIG. 3, the fixed structure 12 and the upper and lower reverser doors 14 and 16 cooperate to provide a substantially smooth nozzle 24, shown in dotted line outline, that is a continuation of the exhaust outlet of the engine 18 and the bypass duct 22.

Referring again to FIG. 1, the fixed structure 12 includes an annular portion 26 that is adapted to be secured to the engine 18 and to a nacelle component 20 in a suitable manner. The annular portion 26 is of conventional construction for aircraft components and may include a suitable sound attenuation treatment 28 for the inner liner. The particular acoustic treatment 28 shown for the inner liner is a conventional perforated honeycomb core with an imperforate back sheet. The fixed structure 12 includes two opposed longitudinally extending side portions 30 and 32. The side portions 30 and 32 house the pivot points for the doors 14 and 16 as well as the actuator mechanisms (not shown) which pivot the doors 14 and 16 from a stowed positions as seen in FIG. 3 to the deployed position shown in FIG. 1 and back to the stowed position. The trailing ends of the side portions 30 and 32 are secured to an annular portion 34. As is apparent in FIGS. 1 and 3, the annular portion 26, the side portions 30 and 32, and the annular rear portion 34 of the fixed structure 12 and the upper and lower doors 14 and 16 cooperate to provide a smooth continuous nozzle for the engine 18 and bypass duct 22 to provide maximum thrust in flight without incurring unwanted drag from the thrust reverser design.

When the doors 14 and 16 are deployed upon landing to slow the aircraft, the trailing edges of the doors abut, as seen in FIG. 1, to deflect the exhaust efflux forwardly in an upwardly directed portion and a downwardly directed portion. A pair of normally stowed kicker plates 36 and 38 carried by the door 14 are biased outwardly at a controlled rate of movement for a predetermined distance to further deflect the first portion of exhaust in a more forwardly direction. Longitudinally extending side fences 40 and 42 are preferably secured to the lower longitudinal edges of the door 14 to aid in controlling the upper plume of the exhaust in a controlled manner and away from control surfaces of an associated aircraft to enhance control of the aircraft upon landing and, if the landing is aborted, upon takeoff.

Figure 2:
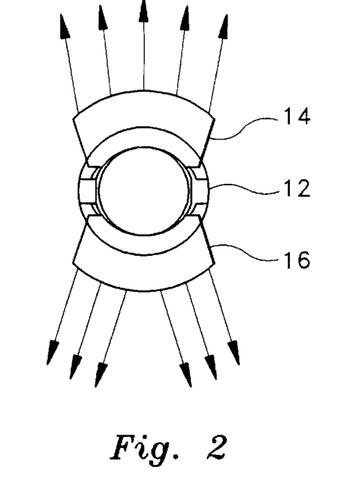
FIG. 2 is a simplified schematic of the invention which illustrates the efflux pattern achieved by the invention.

The lower door 16 is provided with two flow separator plates 44 and 46 that are normally urged to a secured position within the door 16 and which are biased outwardly to a flow splitting position upon deployment of the door 16 to split the downwardly extending exhaust plume into two portions that extend outwardly and forwardly from the reverser 10 to preclude foreign objects lying on a landing field surface from being blown upwardly for ingestion by the engine with resultant damage. Suitable longitudinally extending side fences 48 are secured to the upper longitudinally extending edges of the lower door 16 to assist in controlling and directing the split plumes as desired. The efflux pattern achieved by the thrust reverser 10 is seen most clearly in FIG. 2 and illustrates the effectiveness of such reverser in providing the desired efflux pattern.

Figure 4:
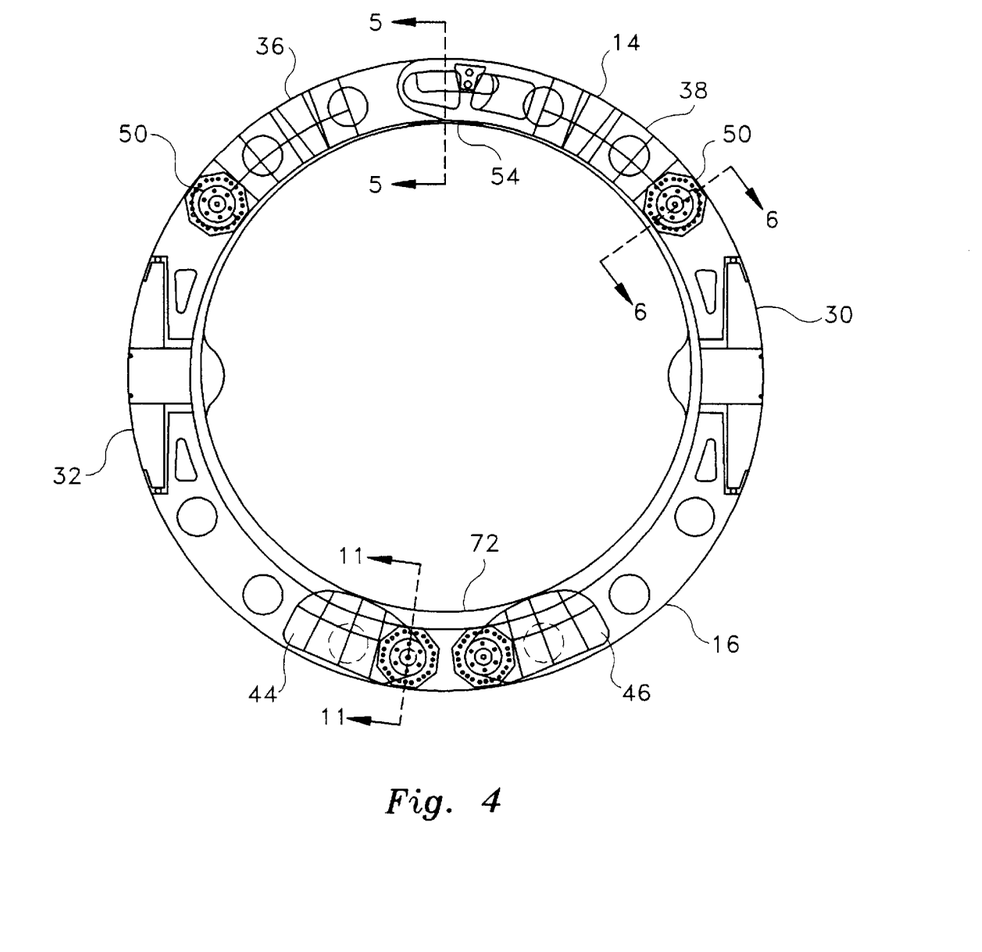
FIG. 4 is a cross-sectional schematic view taken along lines 4—4 of FIG. 3.
Figure 5:
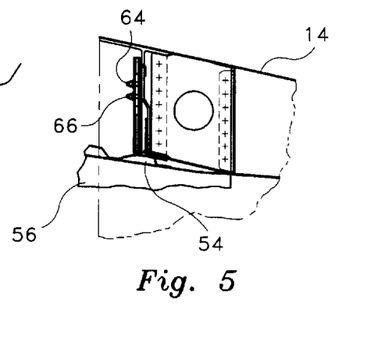
FIG. 5 is a cross-sectional detail view taken along lines 5—5 of FIG. 4.
Figure 6:
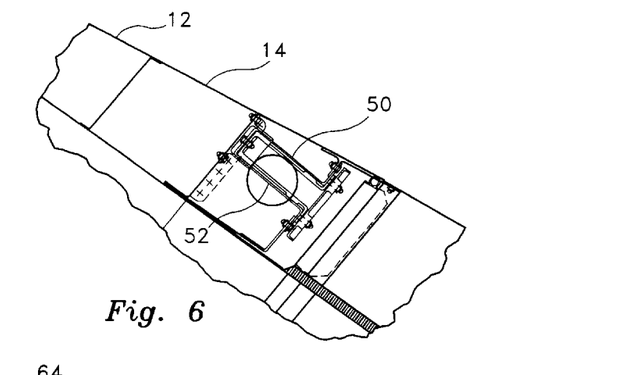
FIG. 6 is a cross-sectional detail view taken along lines 6—6 of FIG. 4.

Referring now to FIG. 4 which represents a cross-sectional view taken along lines 4—4 of FIG. 3, further details of the doors 14 and 16 will be explained. Each of the kicker members 36 and 38 is generally crescent shaped and is pivoted at its outer end to the door 14 by a suitable pivot assembly 50 which includes a suitable torsion spring 52 that biases the associated kicker member outwardly. When the door 14 is stowed as seen in FIGS. 4, 5 and 6, the outwardly biased kicker members 36 and 38 are urged inwardly into a secured position within the outline of the door by contact with a suitable stow bumper 54 positioned on the upper outer surface of an inner portion 56 of the annular portion 26 of the fixed structure 12.

Figure 7:
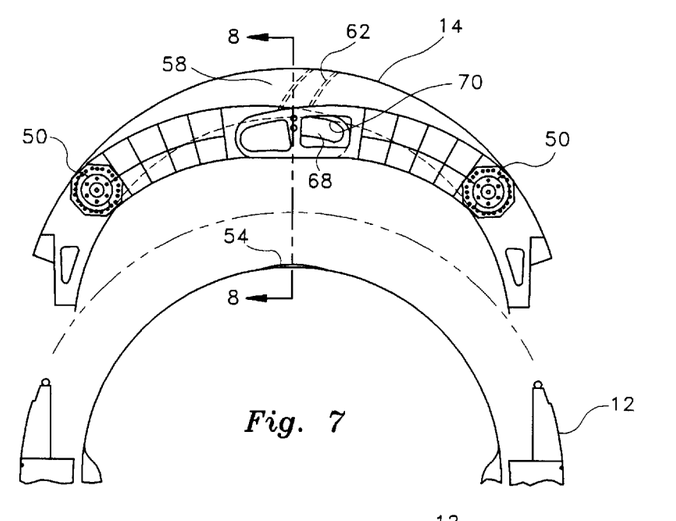
FIG. 7 is a simplified schematic view showing the kicker plates extended when the upper reverser door is deployed.
Figure 8:
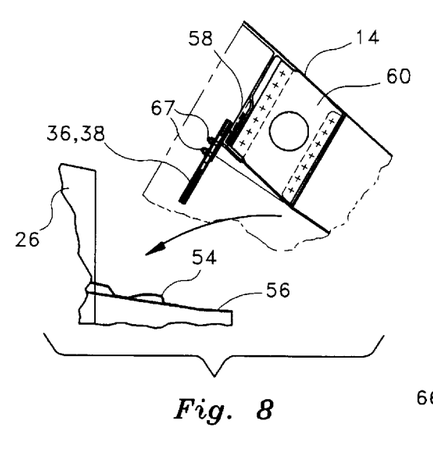
FIG. 8 is cross sectional detail view taken along lines 8—8 of FIG. 7.

When the door 14 is rotated to a deployed position, as seen in FIGS. 7 and 8, each torsion spring 52 biases each associated kicker member 36, 38 outwardly to a predetermined position. This position and the rate of outward movement of the kicker members 36 and 38 are determined in the following manner. The upper deflector door 14 is provided with a fitting 58 that extends inwardly from the door's outer surface and which is attached to suitable structure 60 within the door 14 to support it.

In the illustrated preferred embodiment of the invention, the kicker members 36 and 38 interact in cooperating to control the rate at which they rotate outwardly from the door 14 and the extent to which they extend outwardly to deflect further the reversed air flow. The rate of movement is controlled to preclude the kicker members or deflector edges from coming into full contact with the reversed air stream too quickly.

Figure 8A:
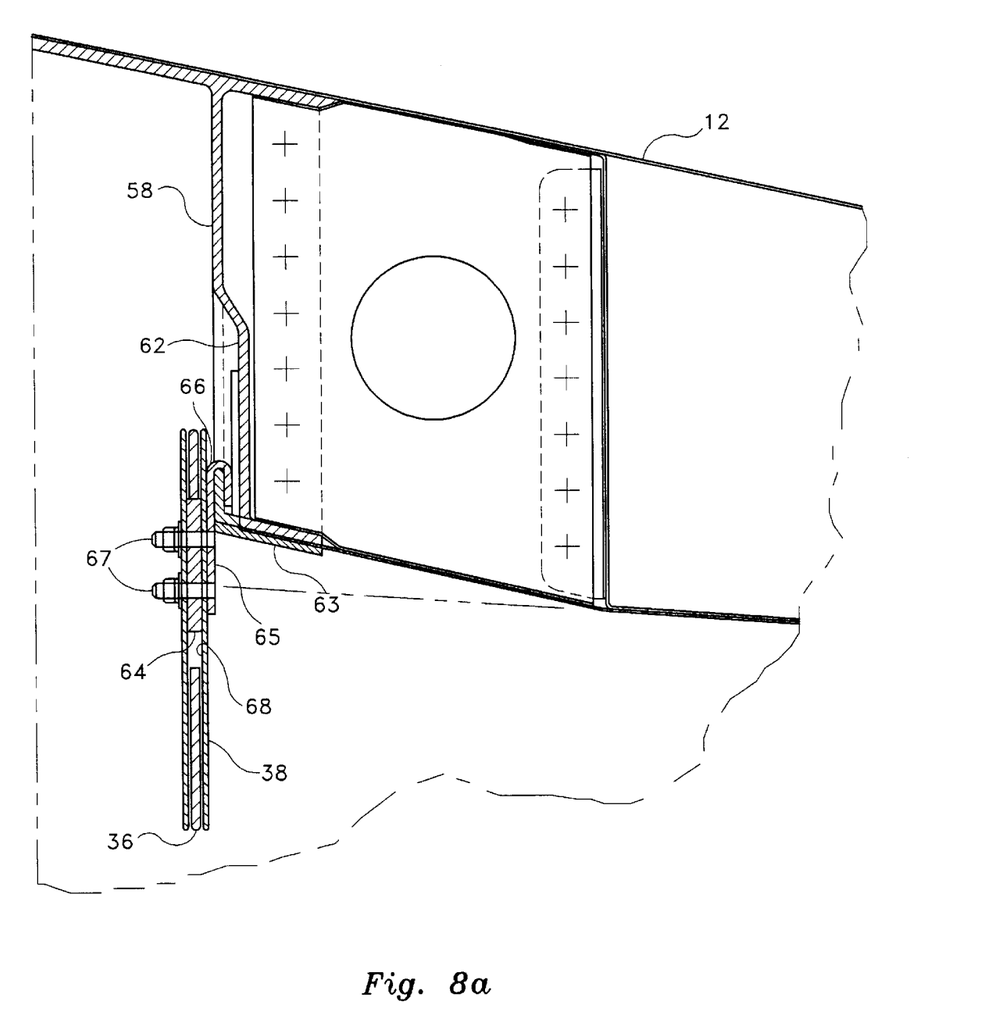
FIG. 8A is a detail view of a portion of FIG. 8.

As seen in FIGS. 7, 8 and 8A, kicker member 36 can be considered to be a tongue member which cooperates with kicker member 38 acting as a clevis member. As the door 14, is opened, the kicker members 36 and 38 cooperate to rotate outwardly to a desired predetermined position. This cooperation is afforded by the fitting 58 being provided with a sloping arcuate guide track 62 having a lower fixed portion 63. The clevis shaped end of kicker member 38 is provided with a suitable spacer element 64 and a cam follower member 65 having a hook shaped upper portion 66. The spacer element 64 and the cam follower hook member are secured to the clevis portion of the kicker member 38 in a suitable manner as by bolts 67.

As seen in FIGS. 7, 8 and 8A, the spacer element 64 extends through a particularly shaped opening 68 provided in the kicker member 36. As the door 12 is opened, the torsion springs 50 rotate the associated kicker members 36 and 38 outwardly. As the door 38 rotates outwardly the rate of such rotation is controlled by the sliding movement of the cam follower element 65 within cam track 62 until the hook portion 66 of the guide element 65 contracts the stop element 63 of the guide track 62 to limit the outward movement of the kicker member 38 from the door 12.

As the kicker member 38 rotates outwardly, the associated kicker member 36 also rotates outwardly. The tongue portion of the kicker member 36 which is received within the clevis portion of the kicker member 38 is controlled in movement by the spacer element 64 carried by the kicker member 38 contracting the inner edge of said particularly configured opening 68 provided in the kicker member 36 in a sliding movement and constraining its movement to a desired cooperative movement.

When the door 12 is rotated inwardly to a stowed position, the outer edges of the doors 36 and 38 contact the bumper 54 and the kicker members 36 and 38 contact the bumper 54 and the kicker members 36 and 38 are guided back to their original stowed positions.

It will be appreciated that while a particular arrangement has been illustrated in FIGS. 7, 8 and 8A for providing a cooperative deployment of the kicker members 36 and 38 it would be within the scope of the invention to provide other means that would yield the same result. For example, roller means could be carried by the door 38 that would cooperate with the guide track 62 and with the opening 70 in door 36.

For ease of illustration, the door 14 and the kicker members 34 and 36 are shown partially deployed in FIGS. 7 and 8 but do illustrate how door 14 deflects one portion of the exhaust flow upwardly and forwardly while the extended kicker members 36 and 38 cooperate to deflect further that portion of the exhaust efflux in a more forward direction.

Figure 9:
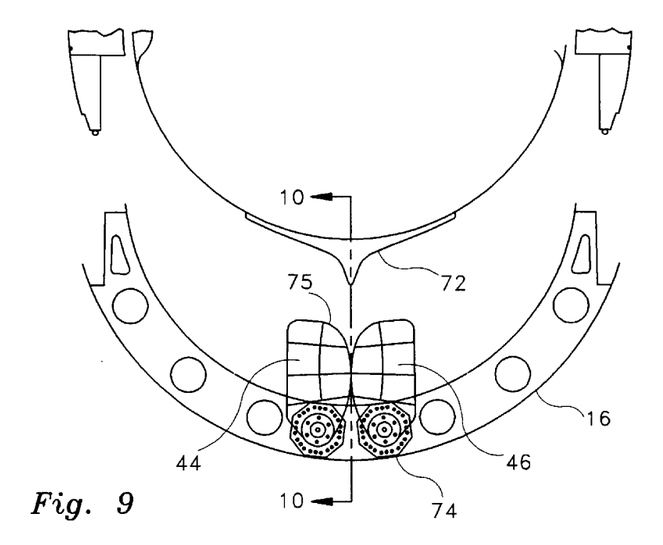
FIG. 9 is a simplified schematic view showing the kicker plates extended when the lower reverser door is deployed.
Figures 10, 11:
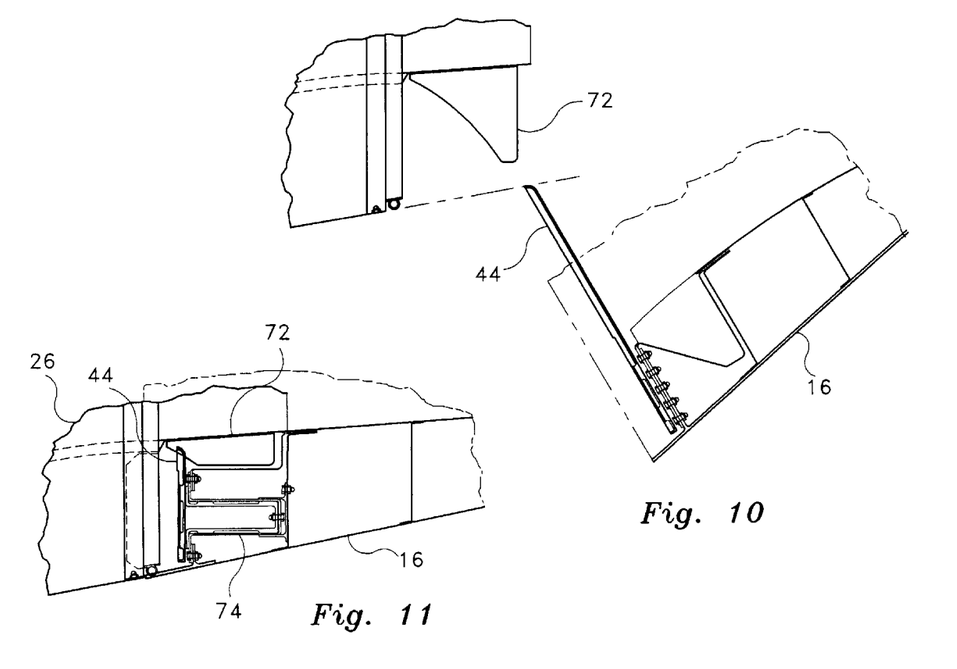
FIG. 10 is a cross-sectional detail view taken along lines 10—10 of FIG. 9.
FIG. 11 is a cross-sectional detail view taken along lines 11—11 of FIG. 4.

Referring now to FIGS. 4, 9, 10 and 11, the arrangement of the lower door 16 and the splitter plates 44 and 46 will be explained in greater detail. As seen in FIG. 4, each of the generally rectangularly shaped splitter plates 44 and 46 are positioned within the general outline of the door 16 when it is in its stowed position by means of a suitably shaped stow bumper 72, positioned on the lower outer surface of the portion 56 of the fixed structure 12, that urges such plates 44 and 46 to a secured position. Each of the plates 44 and 46 are pivotally secured at their lower ends to the door 16 by a suitable torsion spring assembly 74, shown in FIG. 11, that biases the splitter plates 44 and 46 outwardly as the door 16 is deployed and into abutting contact, as seen in FIG. 9, to form what may be considered to be one unitary splitter element to split the lower portion of the exhaust efflux into two desired portions.

As the door 16 is returned to a stowed position, the rounded portions on the outer inside corner 75 of each flow separator plate 44 and 46 engage the forward portion of the stow bumper 72 and are spread apart to the secured position shown in FIG. 4 as the door 16 rotates inwardly to the stowed position. The flow separator plates 44 and 46 extend sufficiently into the lower efflux of the exhaust flow to spit such flow rather than acting like the upper kicker members 36 and 38 which more forwardly direct the upper efflux.

Figure 12:
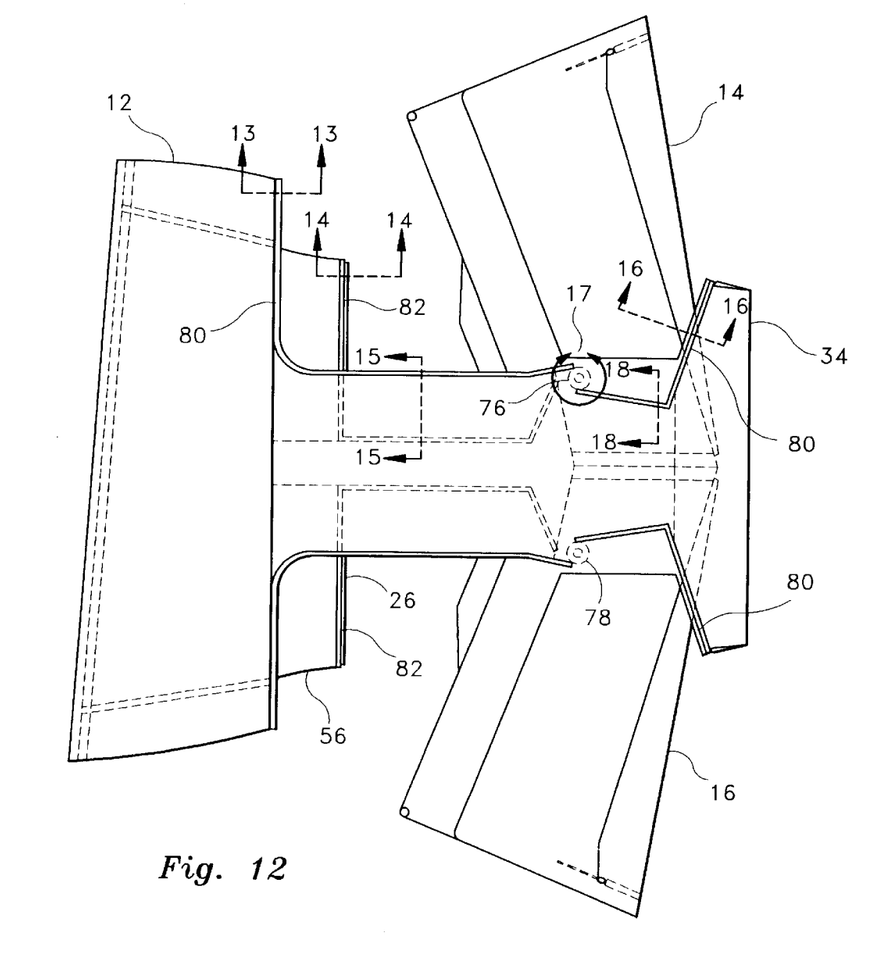
FIG. 12 is a simplified schematic view of the thrust reverser with the doors deployed to better illustrate the seals provided on the fixed structure.

Referring now to FIG. 12, it will be seen that the upper door 14 is journaled to the fixed structure 12 by pivots 76 that lie on an axis transverse to the fixed structure 12. Similarly, the lower door 16 is journaled on the fixed structure 12 by suitable pivots 78 that lie on an axis transverse to the central axis of the fixed structure 12. To ensure that the upper and lower doors 14 and 16 do not leak exhaust flow during flight and thereby reduce the performance of the nozzle provided by the thrust reverser 10, the fixed structure 12 is provided with a first bulb seal 80 and a second lip seal 82 that cooperate with the first and second doors 14 and 16 to preclude leakage.

Figure 13:
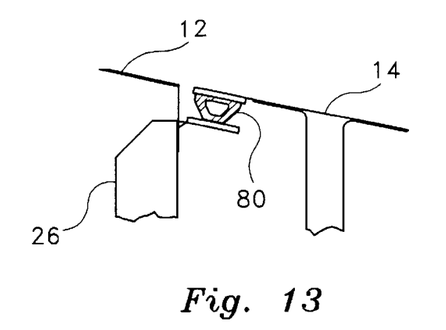
FIGS. 13 to 18 are cross-sectional views of portions of the seals shown in FIG. 12.
Figure 14:
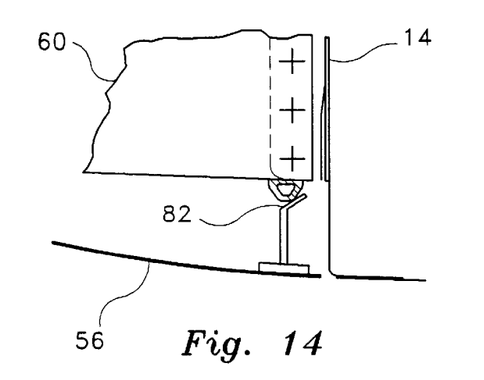
Figure 15:
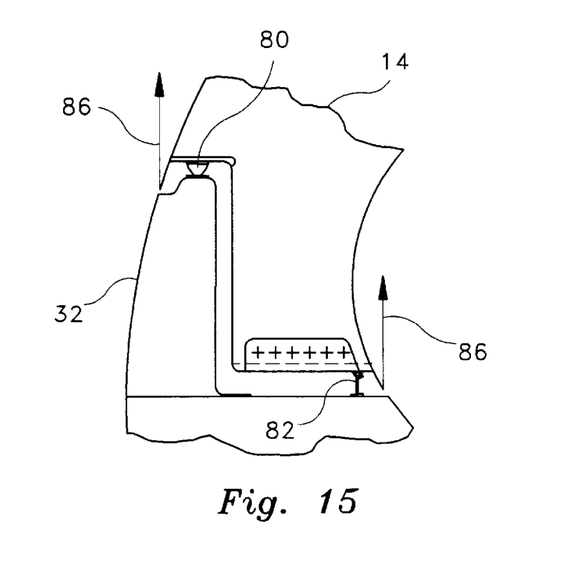
Figure 16:
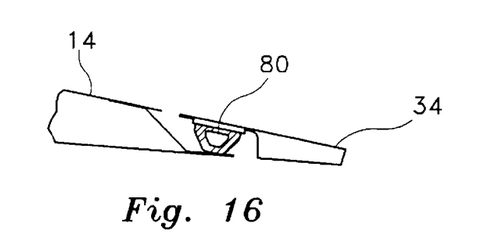
Figure 17:
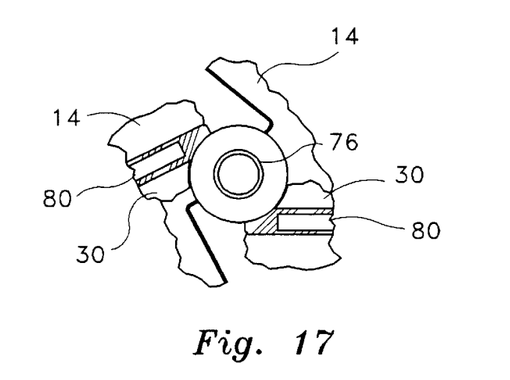
Figure 18:
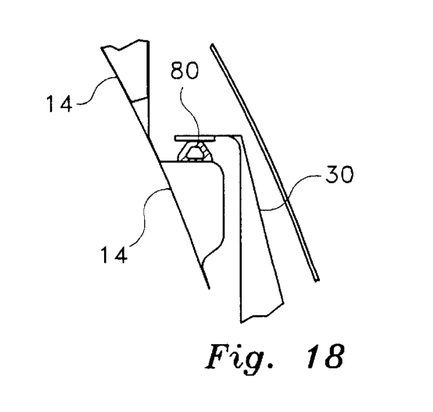

FIG. 13, taken along lines 13—13 of FIG. 12, shows the outer bulb seal 80 cooperating with the thrust reverser door 14. FIG. 14 shows the inner lip seal 82 and the bumper 54 carried by the fixed structure 56 cooperating with the door 14 for sealing. FIG. 15 should be viewed from an orientation in which the arrows 86 indicate up and show the outer bulb seal 80 and the inner lip seal 82 cooperating with the upper door 14. FIG. 16 taken along lines 16—16 of FIG. 12 show the aft bulb seal 80 carried by the aft portion 34 of the fixed structure 12 cooperating with the upper door 14 for sealing. FIG. 17 taken along lines 17—17 of FIG. 12 show the bulb seals 80 carried by the fixed structure portion 30 cooperating with the door 14 in its stowed and deployed positions. FIG. 18 shows the upper door 14 cooperating with the aft bulb seal 80 carried by the side fixed structure portion 30 for sealing purposes.

In summary, it has been seen how the present invention provides a novel pivoting door thrust reverser which is provided with upper and lower doors that have pivoted members that deflect the upper portion of the exhaust flow forwardly to avoid control surfaces of the aircraft and split the lower portion of the exhaust flow into two portions that avoid ingestion by the engine of foreign objects. The control of such efflux is provided by simple novel mechanisms carried by the upper and lower doors. The thrust reverser also provides a very efficient nozzle that provides a smooth continuous flow of exhaust in flight for maximum thrust and peak operating efficiency. A seal arrangement cooperates with the thrust reverser doors to preclude leakage of the exhaust during forward thrust.

Changes maybe made in the combination and arrangement of parts or elements as heretofore set forth in the specification and shown in the drawings, it being understood that changes may be made in the precise embodiment disclosed without departing from the spirit and scope of the invention as defined in the following claims.

We claim:

1. A thrust reverser for use with a turbo- fan type turbojet aircraft engine and comprising:
    a fixed structure arranged to be secured to the aft end of an engine and having an annular wall to provide a nozzle for the exhaust of the engine, said fixed structure defining an outer air flow surface and an inner air flow surface,
    upper and lower symmetrical thrust reverser door members having inner and outer air flow surfaces that are flush with said inner and outer air flow surfaces of said fixed structure and having a leading edge and a trailing edge, each of said door members being pivotally attached at the aft end of the fixed structure and adapted to be movable between a stowed non-reversing position and a deployed thrust reversing position, each of said door members being provided with at least two rotatably movable members carried by each door member at its leading edge that are urged inward to a secured position not extending beyond the inner surface when a door member is in a stowed position and which are pivotally biased outwardly to an air flow deflecting position when the associated door member is pivoted to a deployed position to deflect the reversed flow of the engine in a predetermined manner to preclude foreign object damage to the engine from ingestion of objects from a landing field surface being blown forwardly and ingested by the engine and to preclude interference of the reversed air flow with control surfaces of the aircraft.

2. The thrust reverser of claim 1 wherein the upper door member is provided with at least two movable kicker members that are normally rotatably biased open by spaced torsion spring means and which cooperate for determining the rate and limit of movement, to deflect further the portion of the exhaust reversed by the upper door member when said thrust reverser door members are deployed.

3. The thrust reverser of claim 2 wherein each of the two cooperating movable kicker members of the upper thrust reverser door member are biased normally open and are urged to a closed position by cooperation with said fixed structure when the thrust reverser is in a stowed position.

4. The thrust reverser of claim 3 wherein the kicker members are biased open by spaced torsion spring means that rotatably secure the kicker members to the upper thrust reverser door.

5. The thrust reverser of claim 4 which further includes cam means that is secured to the upper reverser door and which cooperates with the kicker members to control the biased movement of such kicker members as the upper reverser door is moved from a stowed position to a deployed position.

6. The thrust reverser of claim 5 wherein the cam means includes a cam track that is secured to the upper thrust reverser door member and cam follower means that is carried by one of the kicker members and cooperates with he other kicker member to permit the biasing means to urge the kicker members to a predetermined position as the upper thrust reverser door is deployed.

7. The thrust reverser of claim 6 wherein bumper means having predetermined shapes are positioned on said fixed structure and cooperates with the kicker members when the upper and lower thrust reverser doors are moved from a deployed position to a secured position to cause the kicker members to be urged into their secured position as the reverser doors are stowed.

8. The thrust reverser of claim 1 wherein the lower reverser door is provided at its forward edge with at least two biased rotatable flow separator plates that are biased into an exhaust splitting position when the lower thrust reverser door member is moved from a secured to a deployed position.

9. The thrust reverser of claim 8 wherein the two flow separator plates are biased to a normally exhaust splitting position and are arranged to rotate to the exhaust splitting position when the lower thrust reverser door member is moved from a secured to a deployed position.

10. The thrust reverser of claim 9 wherein the two separator plates that are biased by torsion spring means carried by the lower thrust reverser door member and which cooperate with such plates to urge them inwardly to an exhaust splitting position when the reverser door members are deployed.

11. The thrust reverser of claim 10 wherein the two flow separator plates are secured to the lower reverser door member by the torsion spring means and are biased to rotate into contact with each other when the lower thrust reverser door member is deployed position to a thrust reversing position.

12. The thrust reverser of claim 11 which further includes a bumper means having a predetermined shape that is positioned on said fixed structure and which cooperates with said biased plates as the second thrust reverser door member is moved from a deployed position to a stowed position to rotate said plates to a secured position in the stowed position of the second reverser door.

13. A thrust reverser for use with an aircraft engine and comprising:
    a fixed structure arranged to be secured to the aft end of an engine and adapted to provide a nozzle for the exhaust of an engine;

at least two generally symmetrical thrust reverser door members, each of said reverser doors being pivotally attached at a trailing end to the fixed structure and cooperating with the fixed structure to provide a nozzle for the engine that provides a substantially continuous flow path for the exhaust of said engine, and one of said thrust reverser doors arranged in an upper portion of the fixed structure and being provided with two cooperating generally crescent shaped kicker members that are normally biased open and which are urged to a secured position when the upper door is stowed, said kicker members being biased outwardly from the upper reverser door when it is deployed to further deflect the reversed exhaust flow forwardly when the exhaust is being reversed.

14. The thrust reverser of claim 13 wherein the two kicker members are normally biased outwardly by torsion spring means and urged inwardly by cooperation with a bumper means having a predetermined shape to a position where they do not interfere with the exhaust flow when the thrust reverser is stowed.

15. The thrust reverser of claim 14 which further includes cam means carried by the upper reverser door and cooperating with the kicker members as the upper door is deployed to control the inward rotation of the kicker members to a desired exhaust deflecting position.

16. A thrust reverser for use with an aircraft engine and comprising:

a fixed structure arranged to be secured to the aft end of an engine and adapted to provide a nozzle for the exhaust of the engine;

at least two generally symmetrical thrust reverser door members, each of said door members being pivotally attached at a trailing end of the fixed structure and adapted to be movable between a stowed non-reversing position and a deployed thrust reversing position, the upper and lower reverser doors cooperating with the fixed structure to provide a substantially continuous nozzle for the exhaust, and one of said reverser doors arranged in a lower portion of the fixed structure and being provided with a pair of rotatable generally rectangularly shaped flow separator plates that are urged inwardly to a secured position by cooperation with the fixed structure when the lower door is stowed and which are biased outwardly as the lower door is moved to a deployed position to a position to split the reversed exhaust flow into two diverging portions to preclude the ingestion by the engine of foreign objects.

17. The thrust reverser of claim 16 wherein the separator plates are biased outwardly and into abutting contact with each other by spring torsion means to provide a unitary exhaust splitting member and thereby split the exhaust flow into two streams which extend outwardly from the engine in a predetermined efflux pattern.

* * * * *